United States Patent [19]
Troy

[11] 3,846,575
[45] Nov. 5, 1974

[54] CABLE SHEATH AND READY ACCESS CLOSURE INCLUDING A CABLE SHEATH

[75] Inventor: Michael K. Troy, Elmhurst, Ill.

[73] Assignee: Reliable Electric Company, Franklin Park, Ill.

[22] Filed: July 16, 1973

[21] Appl. No.: 379,792

[52] U.S. Cl. ............... 174/41, 24/201 C, 138/128, 138/168, 174/68 C, 174/72 A
[51] Int. Cl. ..................... H02g 7/06, H02g 3/04
[58] Field of Search ............. 174/5 R, 40 R, 41, 44, 174/59, 60, 68 C, 72 A, 92, 135, 136; 24/201 C, 201 HH; 138/128, 162, 166, 168; 161/48; 317/118, 120

[56] References Cited
UNITED STATES PATENTS

| | | | |
|---|---|---|---|
| 667,195 | 2/1901 | Davis | 174/72 A UX |
| 1,862,811 | 6/1932 | Strong | 174/41 X |
| 2,891,101 | 6/1959 | Koliss | 174/59 |
| 3,080,892 | 3/1963 | Plummer | 138/128 |
| 3,144,500 | 8/1964 | Schreyer | 174/41 |
| 3,153,693 | 10/1964 | Baxter et al | 174/40 R |
| 3,517,702 | 6/1970 | Mueller et al | 138/168 X |
| 3,630,564 | 12/1971 | Ferrara | 174/72 A X |
| 3,654,049 | 4/1972 | Ausnit | 138/168 X |
| 3,701,835 | 10/1972 | Eisele et al | 174/41 |

*Primary Examiner*—Laramie E. Askin
*Attorney, Agent, or Firm*—Olson, Trexler, Wolters, Bushnell & Fosse, Ltd.

[57] ABSTRACT

A ready access closure for communications cables comprises a base assembly, a removable cover for the base assembly, a terminal block mounted on a metallic strip on the base assembly, and a plastic sheath for the part of the cable that is within the closure. The sheath surrounds the cable and has a notch in its wall for receiving the wires that are dedicated or terminated at the terminal block, the sheath, however, preventing access to the other wires of the cable. The sheath has longitudinal margins that define a side opening for receiving the cable upon installation of the sheath. Those longitudinal margins have fingers that snap fit to close the opening formed thereby. A bead on one of the fingers prevents mismating of the fingers.

9 Claims, 13 Drawing Figures

PATENTED NOV 5 1974 3,846,575

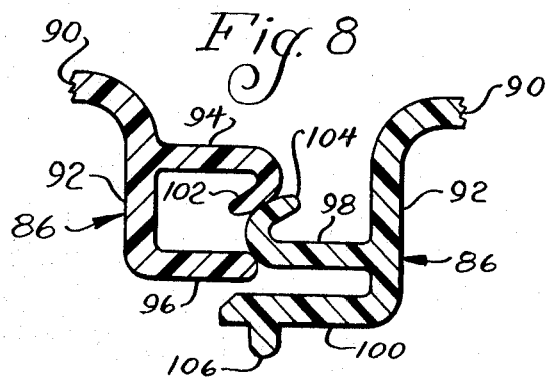
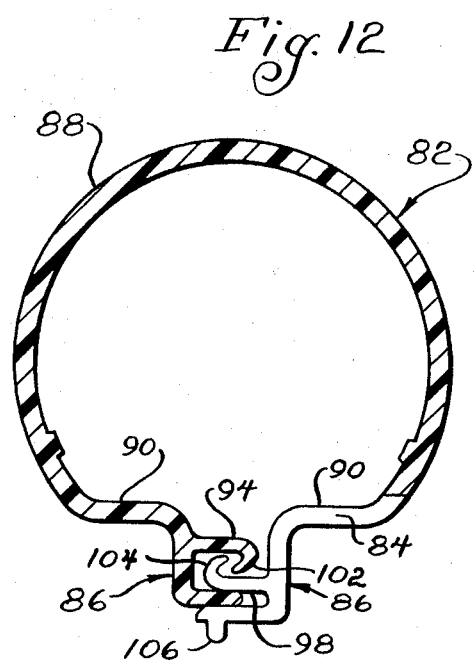
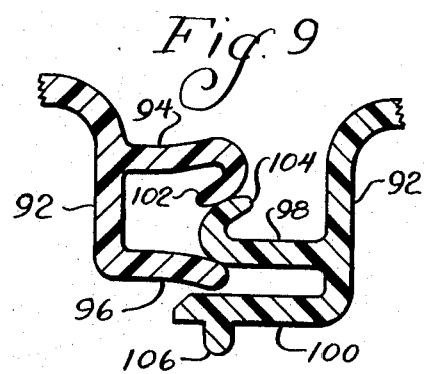
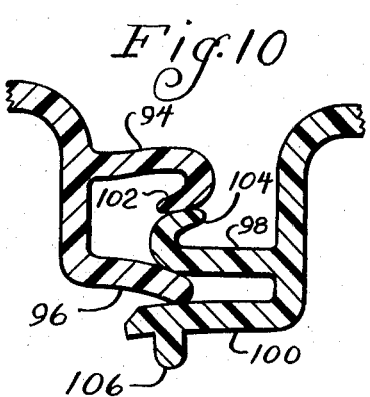
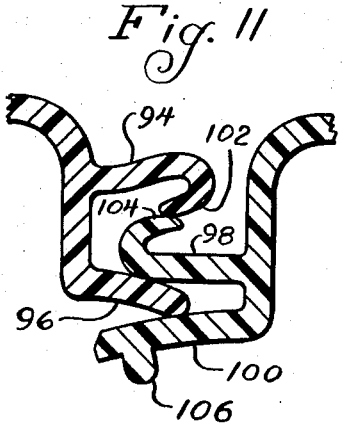
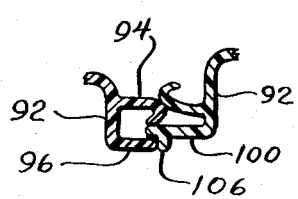

CABLE SHEATH AND READY ACCESS CLOSURE INCLUDING A CABLE SHEATH

BACKGROUND OF THE INVENTION

This invention relates to improvements in closures for telephone and like communications cables, and more particularly to a ready closure that embodies a plastic jacket or sheath that prevents access only to the dedicated wires of the cable.

Telephone splice closures of the ready access type are used for terminating or dedicating wire pairs on one or more terminal blocks within the closure. The service drops, as needed, are then connected to the terminal block or blocks, and passed outwardly of the closure for routing to the service areas. In closures of this type the insulation and grounding sheild of the cable are removed for purposes of terminating the desired wire pairs on the terminal blocks. However, the removal of the insulation and grounding shield renders the remaining wires of the cable accessible. Sometimes, however, it is desired that only the terminated or dedicated wires be accessible to service personnel.

OBJECTS AND SUMMARY OF THE INVENTION

It is an object of this invention to provide a ready access closure which embodies a cable sheath that renders inaccessible all of the wires of the cable except those that are dedicated.

It is a further object of this invention to provide a cable sheath that can be used in various types of ready access closures to convert them to "fixed count" closures, namely closures having a fixed number of terminated or dedicated wires.

It is a further object of this invention to provide a cable sheath of the type stated which can be easily installed by service personnel and yet is difficult to remove once installed.

In accordance with the foregoing objects the ready access closure of the present invention is intended for a communications cable having a plurality of insulated wires and a metallic grounding shield surrounding the wires. The cable and the closure are supported by a strand or messenger, as it is called. The closure comprises a base assembly having opposed ends and a member extending therebetween. These ends have aligned openings for receiving the cable, and the metallic grounding shield of the cable is interrupted in the region between those ends. The closure further includes electrically conductive clamps adjacent to said ends and secured to said member. An electrically conductive strap is also provided on said member and is in conductive connection with the clamps. The clamps are secured to the messenger and are in conductive connection with the grounding shield of the cable so as to provide an electrical continuity between the cut off ends of the grounding shield within the closure. At least one terminal block is mounted on the conductive strap and has conductive terminals for connection with a group of wires from the cable. This group of wires is, of course, less than all of the wires of the cable. A cable sheath is positioned over said cable between the clamps and has adjacent longitudinal margins that define a lateral opening into the sheath and through which the cable may pass upon mounting of the sheath onto the cable. The longitudinal margins have cooperating means, such as fingers, for snap-fitting engagement to close the sheath. The sheath also has a notch that forms a lateral opening in the wall of the sheath and through which said group of wires (being the terminated or dedicated wires) projects. The notch is of such size that the remaining wires of the cable are substantially inaccessible for connection to the terminal block. Finally, the entire closure is provided with a removable cover that cooperates with the base for substantially enclosing the sheath-covered cable and the terminal block.

The cable sheath proper comprises a one piece plastic tubular body open at its opposite ends. A pair of fingers is located at each of the longitudinal margins previously described. The fingers of the pair at one longitudinal margin are of different lengths and the longer of them has a hook that projects toward the other. The pair of fingers at the other longitudinal margin projects toward the first-mentioned pair of fingers, and one of the fingers at said other longitudinal margin has a hook that projects away from the other finger of that pair. The fingers having the hooks are adapted for interlocking such that the hook-containing finger at said other margin is intermediate the fingers of the first-mentioned pair and the other finger of the first-mentioned pair is intermediate the fingers of pair at said other margin. Finally, the other finger of the pair at said other margin is provided with means such as a bead or the like for preventing mis-mating of fingers.

BRIEF DESCRIPTION OF THE FIGURES

FIGS. 8, 9, 10 and 11 are fragmentary sectional views taken transversely of the cable sheath and showing various steps in snap fitting together the fingers at the longitudinal margins of the sheath;

FIG. 12 is a transverse sectional view of the cable sheath on an enlarged scale taken along line 12—12 of FIG. 1; and FIG. 13 is a fragmentary sectional view similar to FIGS. 8-11 but on a smaller scale and showing how the bead on one of the fingers prevents mismatching or misassembly of the fingers.

DETAILED DESCRIPTION

Figure 7:
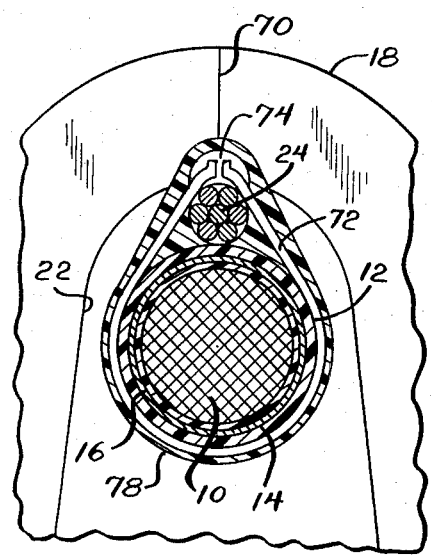
FIG. 7 is a fragmentary sectional view on an enlarged scale taken along line 7—7 of FIG. 1.
Figure 6:
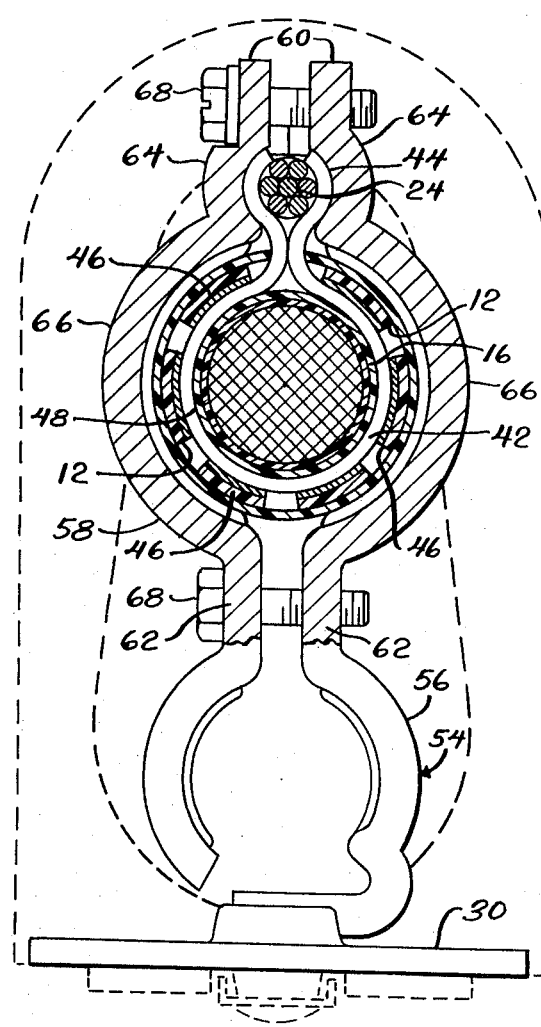
FIG. 6 is an enlarged fragmentary sectional view on an enlarged scale taken along lines 6—6 of FIG. 5.

Referring now in more detail to the drawing, which illustrates a preferred embodiment of the present invention, there is shown a closure 2 including generally a base 4 and a cover 6. The closure 2 is intended for a communication cable 8, such as a telephone cable, having a number of individual insulated wires 10. Typically, and as best seen in FIGS. 6 and 7, cable 8 includes an outer plastic jacket 12 that surrounds a metallic grounding shield 14 which, in turn, surrounds an inner plastic core wrapper 16. The individual insulated cable wires 10 are confined within the inner core wrapper 16.

Figure 2:
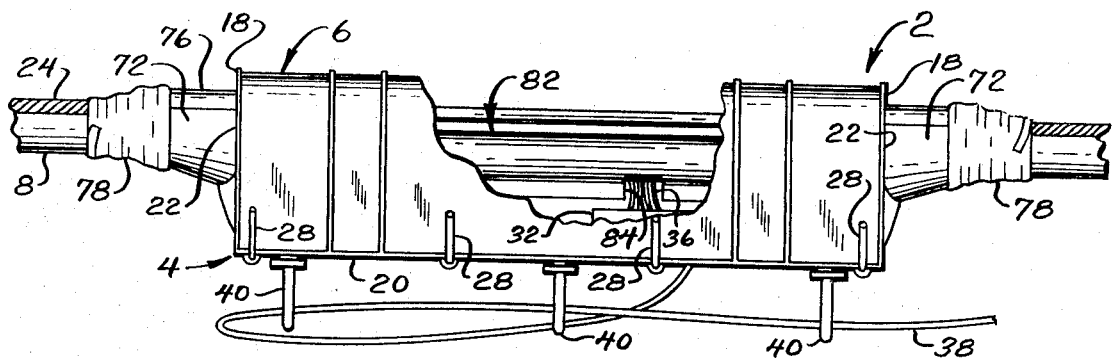
FIG. 2 is a side elevational view of the closure with part of the cover broken away.

The base assembly 4 of the closure 2 includes a U-shaped plastic structure made up of spaced apart ends 18, 18 that are joined at their lower margins by a bottom member 20. Each of the ends 18, 18 has openings at 22, 22 for receiving the cable 8. These openings 22, 22 also receive a cable-supporting strand or messenger 24, as it is known in the art. The cover 6 is a downwardly opening U-shaped member having marginal inturned flanges 26 at each of its opposite ends and also along its longitudinal margins for fitting on the outsides of the ends 18, 18 and the member 20. The cover is shown in closed position in FIG. 2. Provided on the exterior of the member 20 are pivotally mounted spring-wire cover locks 28 which grip the sides of the cover 6 when the latter is in closed position on the base assembly 4, thereby to retain the cover and base assembly together.

Figure 1:
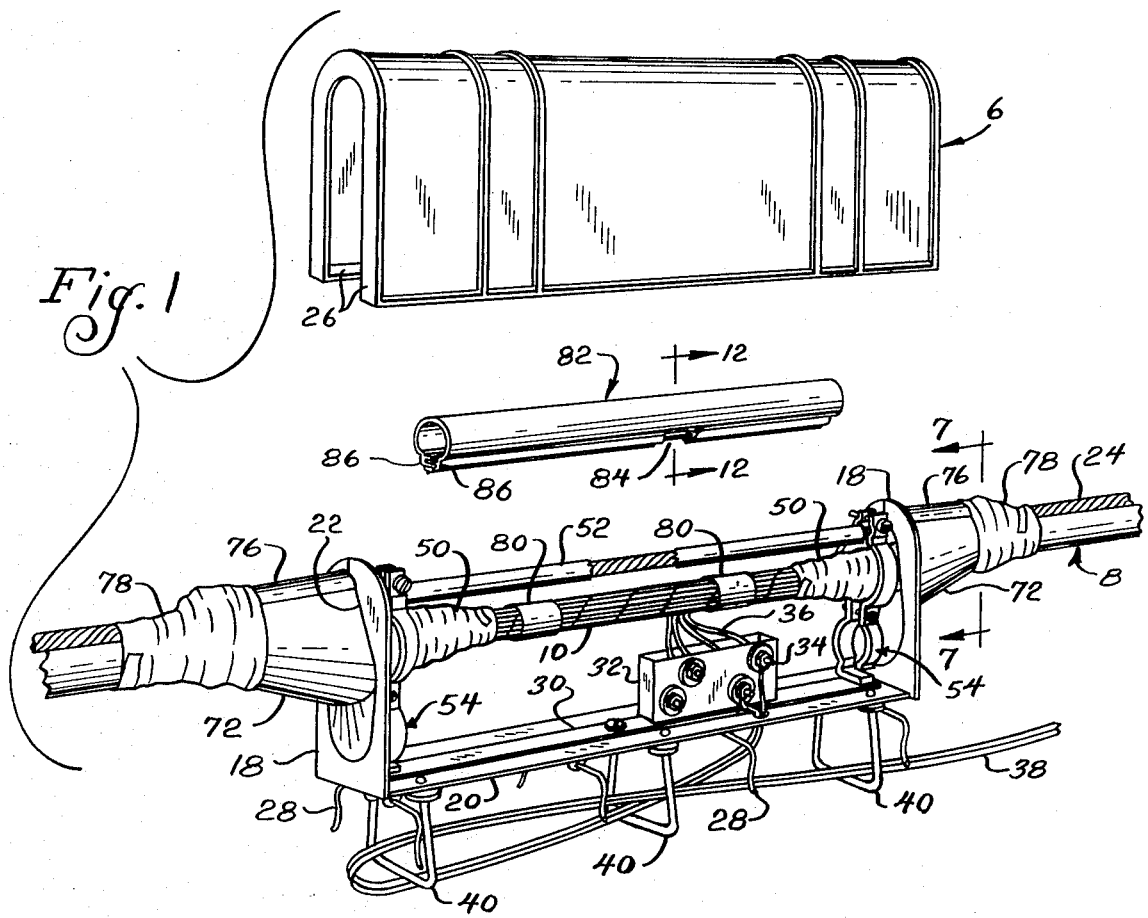
FIG. 1 is an exploded perspective view of a ready access closure constructed in accordance with and embodying the present invention.

Screwed or otherwise rigidly mounted on the inside surface of the member 20 is an elongated metallic strap 30 that runs substantially the full length of the member 20. Mounted on the strap 30 is a dielectric terminal block 32 having a number of conductive terminals 34 thereon. The manner of securing the block 32 to the strap 30 may be by screws (not shown) or other conventional means. In the present example of the invention, only one terminal block 32 is shown, but it will be understood that more than one terminal block may be mounted on the strap 30. Furthermore, the terminal block may be longer or shorter than that shown depending upon the number of terminals 34 thereon. The terminals 34 are adapted to receive or terminate a number of wires 36 from among the wires in the cable. These wires 36 make up the desired number of pairs of wires which are to be dedicated at the closure. The non-dedicated wires of the cable simply continue without interruption through the closure as best seen in FIG. 1. The terminal block 32 may also receive loading coils if desired. One or more service drops such as shown at 38, may be connected to appropriate terminals 34 of the terminal block 32 as shown in FIG. 1. The service drop 38 extends through an opening in the member 20 and is supported by wire rings 40. Only one service drop 38 is shown but it will be apparent that other service drops may extend from the terminal block.

From FIG. 1 it will be noted that the outer jacket 12 and the metallic grounding shield 14 of the cable are removed from a part of the cable that is within the closure in order that access may be had to the cable wires 10 for terminating the required number of wires 10 at the terminal block. However, because the grounding shield 14 is interrupted, an arrangement must be provided for restoring continuity of the grounding shield between the interrupted ends thereof. Accordingly, an inner sheath clamp 42 (FIG. 6) is installed on the cable adjacent to the ends 18, 18.

Figure 3:
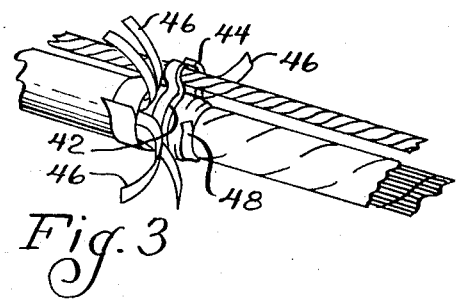
FIGS. 3, 4 and 5 show steps in installing the brackets or clamps onto the cable.
Figure 4:
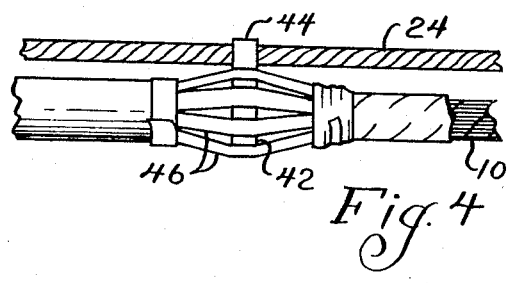
Figure 5:
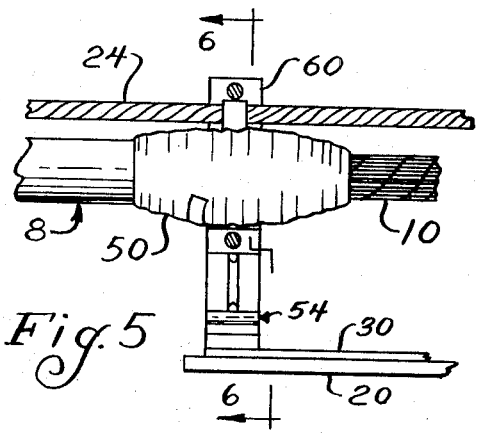

FIGS. 3-5 show generally the manner in which the inner sheath clamp 42 is installed. It will be noted that the inner sheath clamp 42 has a lower portion for circling the cable inner sheath or core wrapper 16 and an upper part 44 for gripping engagement with the messenger 24. Briefly, a series of longitudinal cuts are made in the outer jacket 12 and grounding shield 14 to provide a series of tabs 46 which are best seen in FIGS. 3 and 4. A plastic tape slip collar 48 (FIGS. 3 and 6) is formed on the cable and is slid under the tabs 46. The inner sheath clamp 42, being of readily bendable metal, is installed on the cable and slid over the slip collar 48 and with the upper part 44 in an engagement with the messenger 24. The tabs 46 are then pulled forwardly so that the metallic grounding shield portions thereof overlie the inner sheath clamp 42 and are in conductive contact therewith as shown in FIG. 6. A tape wrapping 50 may then be applied over the tabs 46 as shown in FIG. 5. In some instances it may be desired to provide the messenger with an insulator 52, which is a longitudinally slit tube and which may be installed if required.

The base assembly 4 is suitably provided with brackets or clamps 54, 54 which are positioned adjacent to the ends 18, 18 as best seen in FIG. 1. Each clamp 54 includes a fixed portion 56 the base of which that is rigidly secured to the strap 30 as by screws or the like. Each clamp 54 also comprises a movable portion 58 (FIG. 6), and the two portions 56, 58 are substantially companion-shaped at their upper ends. Thus, the fixed and movable portions 56, 58 have opposed upper and lower flat sections 60, 60 and 62, 62 and upper arcuate sections 64, 64 for gripping the upper part 44 of the inner sheath clamp. Additional and somewhat larger lower arcuate sections 66, 66 are provided for gripping the wrapped cable. Bolts 68, 68 pass through the respective flat sections and may be tightened to secure the clamp portions together. To permit installation of the clamps onto the cable, the lower bolt 68 is removed (or not in place initially) which allows the movable part 58 to swing upwardly about the axis of the upper bolt 68.

It should be noted that the ends 18, 18 are each formed with a vertical slit 70 extending downwardly from the upper periphery thereof and to the opening 22 therein to permit assembly of the cable with the ends 18, 18 prior to installation of the clamps 54. The plastic of the ends 18, 18 is sufficiently flexible whereby the adjacent parts of the end 18 can be separated at the slit 70 for this purpose.

Nozzle-like members 72, 72 may be installed around the cable 8 outside of the ends 18—18 for closing off the openings 22. Each nozzle member 72 has opposed longitudinal margins that define a gap 74 (FIG. 7) whereby spreading apart the adjacent sections of the nozzle 72 can open the gap 74 to permit installation of nozzle 72 onto the cable 8 and also onto the messenger 24. The nozzle 72 may be held in place by a nozzle lock 76 of conventional design, and finally a tape wrap 78 may be disposed around the end of the nozzle and the adjacent stretch of cable and messenger.

The part of the cable within the enclosure 2 may have short tape wraps 80 to hold the wires bundled together. However, this still leaves the wires of the cable exposed when the cover 6 is removed. As pointed out earlier in the specification, it is desired in some instances to render inaccessible all the wires of the cable except the dedicated wires 36. For this purpose the present invention utilizes a cable sheath 82 which is preferably a one-piece flexible plastic extrusion having the configuration shown more particularly in FIGS. 1 and 8-13. The sheath 82 is preferably cut to a length slightly less than the distance between the clamps 54—54. This sheath 82 forms a substantially closed tubular arrangement as will presently be more fully described. However, suffice it to say for the present that the sheath 82 has longitudinal margine 86, 86 that may be spread apart for installing the sheath 82 over the part of the cable within the closure. These longitudinal margins 86, 86 have means for snap-fitting engagement to close the sheath. The sheath also has a notch 84 that extends to one of the longitudinal margins and through which the dedicated wires 36 can be caused to pass as the sheath 82 is being installed over the cable.

Referring now more particularly to FIGS. 8-13, it will be seen that the sheath 82 is of arcuate shape over a major portion 88 of its cross-section. The arcuate portion 88 terminates at opposed ends in generally flat sections 90, 90 and the flat sections of 90, 90 merge about at right angles with downwardly extending parallel segments 92, 92. The segments 92, 92 thus form a portion of each longitudinal margin 86, 86. Extending at right angles from each segment 92, 92 is a pair of spaced parallel fingers 94, 96, 98, 100. The opposed fingers 94, 98 have hooks 102, 104 forming acute angles with their associated fingers for interlocking snap engagement when the finger 98 is inserted between the fingers 94, 96 and with the finger 96 intermediate the fingers 98, 100. A bead 106 on the finger 100 prevents improper assembly, as shown in FIG. 13, by obstructing the finger 100 from entering the space between the fingers 94, 96. Furthermore, the finger 94 is somewhat longer than the finger 96 and the finger 100 is somewhat longer than the finger 98. Because the finger 96 is shorter than the finger 94, the actual opening to receive the finger 98 is larger than if the fingers 94, 96 were of equal length.

The longitudinal margins 86, 86 can be spread apart to provide an opening for reception of a cable within the sheath 82 and with the dedicated wires 36 passing through the notch 84. The margins 86, 86 will tend to spring back together after positioning over the cable and will be in the positions shown in FIG. 8. As the margins 86-86 are pushed together as shown in FIG. 9, the finger 94 tends to bend due to the engagement of the hooks 102, 104. The finger 96 is not yet in contact with the finger 100 due to its shorter length.

Upon further pushing of the margins together, as shown in FIG. 10, all four of the fingers are in respective contact, the two fingers 94, 98 being in contact through the hooks 102, 104. Upon further pushing together of the margins as shown in FIG. 11, fingers 94 and 96 along with finger 100 are bending to provide the necessary space for interfitting of the fingers. The relativey shorter finger 96 tends to reduce the amount of deflection necessary and hence the strain on finger 100. This reduces the amount of force necessary to close the margins. Finally, the hooks 102, 104 snap past each other and the several parts of the longitudinal margins assume the positions shown in FIG. 12. Once the longitudinal margins are snapped closed it is difficult to reopen them, which inhibits service personnel from gaining access to the wires of the cable that continue through the closure.

The invention is claimed as follows:

1. A ready access closure for a communications cable having a plurality of insulated wires and a metallic grounding shield surrounding said wires, said cable being supported by a messenger, said closure comprising a base assembly having opposed ends and a member joined to said ends and extending therebetween, said ends having openings receiving the cable, said metallic grounding shield being interrupted between said ends, means including electrically conductive clamps adjacent to said ends and secured to said member, an electrically conductive strap on said member and being in conductive connection with said clamps, said clamps being secured to said messenger and to said metallic grounding shield, at least one terminal block on said strap and having conductive terminals, a group of wires from said cable being connected to said terminals, said group of wires being less than all of the wires of said cable, a cable sheath constituting a closure over said cable, said sheath lying between said clamps and having adjacent longitudinal margins that define a lateral opening into the sheath and through which the cable may pass upon mounting the sheath onto the cable, said longitudinal margins having cooperating means for snap-fitting engagement to close said sheath and inhibit ready separation of said margins, said sheath also having a notch that forms an additional lateral opening and through which said group of wires projects, the notch being of such size that the remaining wires of the cable are substantially inaccessible for connection to said terminal block, and a removable cover cooperating with said base assembly substantially enclosing the sheath-covered cable and said terminal block.

2. A ready access closure according to claim 1 in which said notch is adjacent to said longitudinal margins.

3. A ready access closure according to claim 1 in which said cooperating means comprises a finger at each longitudinal margin, the fingers snap-fitting together to close the sheath.

4. A combination that includes a communications cable having a plurality of insulated wires and means sheathing the wires, a closure within which a length of the cable extends, said sheathing means being removed over a part of the cable within said closure, terminal block means in said closure, a group of said wires constituting less than all of said plurality of wires being connected to said terminal block means and the remainder of said wires extending through said closure beyond opposite ends thereof, and a tubular sheath over said cable length within said closure, said sheath having opposed longitudinal margins that define an opening for receiving said cable length, said longitudinal margins having means for joining the same to close the sheath and inhibit ready separation of said margins, and said sheath also having a notch in the wall thereof and through which said group of wires projects, said notch being of such size that said remainder of the wires are substantially inaccessible for connection to said terminal block means.

5. A combination according to claim 4 in which said joining means includes interlocking fingers.

6. A combination that includes a communications cable having a plurality of insulated wires and electrically conductive means sheathing the wires, a closure within which a length of the cable extends, said sheathing means being removed over a part of the cable within said closure to leave interrupted ends of said sheath, means for providing a continuous electrically conductive path between said interrupted ends, terminal block means in said closure, a group of wires constituting less than all of said plurality of wires being connected to said terminal block means and the remainder of said wires extending through said closure beyond opposite ends thereof, and a tubular sheath over said cable length within said closure, said sheath having a notch and through which said group of wires projects, said notch being of such size that said remainder of the wires are substantially inaccessible for connection to said terminal block means, said sheath having opposed longitudinal margins defining an opening therein, a pair of fingers being at each margin, the pair of fingers at one margin being of different lengths and one of them having a hook that projects toward the other finger, the pair of fingers at the other margin projecting toward the first-mentioned pair of fingers, one of the fingers at said other margin having a hook that projects away from the other finger of that pair, the hooks and their respective fingers forming acute angles, said fingers having the hooks being adapted for interlocking such that the hook-containing finger at said other margin is intermediate the fingers of the first-mentioned pair and the other finger of the first-mentioned pair is intermediate the fingers of the pair at said other margin, the other finger of the pair at said other margin having means for preventing mis-mating of the fingers.

7. A cable sheath comprising a one piece plastic member constituting a tubular body open at its opposite ends, said body also including longitudinal margins that define an opening into the body, a pair of fingers being at each margin, the pair of fingers at one margin being of different lengths and one of them having a hook that projects toward the other finger, the pair of fingers at the other margin projecting toward the first-mentioned pair of fingers, one of the fingers at said other margin having a hook that projects away from the other finger of that pair, the hooks and their respective fingers forming acute angles, said fingers having the hooks being adapted for interlocking such that the hook-containing finger at said other margin is intermediate the fingers of the first-mentioned pair and the other finger of the first-mentioned pair is intermediate the fingers of the pair at said other margin, the other finger of the pair at said other margin having means for preventing mis-mating of the fingers.

8. A cable sheath according to claim 7 having a notch in the wall thereof extending to one of said longitudinal margins, said notch being intermediate said opposite ends.

9. A cable sheath according to claim 8 wherein said means for preventing mis-mating of the fingers comprises a projecting bead formed on said other finger of the pair at said other margin.

* * * * *